2,900,405
HALOMETHANEPHOSPHONATES

Marvin A. McCall and Richard L. McConnell, Kingsport, Tenn., assignors to Eastman Kodak Company, Rochester, N.Y., a corporation of New Jersey No Drawing. Application May 29, 1953
Serial No. 358,548

7 Claims. (Cl. 260—461)

This invention relates to a new and valuable class of organophosphorus compounds. More particularly, this invention relates to organophosphorus compounds of the general type:

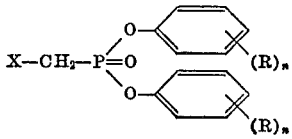

wherein X represents halogen, R is alkyl, hydrogen, or halogen, and $n$ is an integer 1 to 5.

These organophosphorus compounds are readily prepared by the reaction of molar proportions of the phenol with halomethanephosphonic acid dichloride in the presence or absence of such catalysts as magnesium chloride. For example, diphenylchloromethanephosphonate can be prepared substantially according to the reaction:

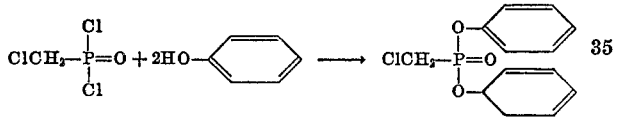

This new class of organophosphorus compounds is particularly useful as plasticizers for cellulose esters and to have the valuable property of being completely compatible and imparting the property of non-inflammability when incorporated in small amounts with cellulose esters, polystyrene, polymethylmethacrylate, and the like. They are also potentially valuable as solvents, insecticides, and intermediates for the preparation of other organophosphorus compounds.

The following examples will illustrate the new compounds, but the invention is not to be considered as restricted to these specific compounds.

*Example 1.—Bis-(2-chlorophenyl) chloromethanephosphonate*

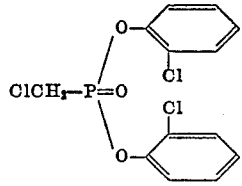

A mixture of 167.5 grams (1.0 mole) of chloromethanephosphonyl dichloride and 257.2 grams (2.0 moles) of o-chlorophenol was heated at reflux for eight hours. The apparatus consisted of a round bottom flask and a condenser equipped with a drying tube to protect the reaction mixture from atmospheric moisture. After the initial heating period of eight hours, the reaction mixture was cooled and slowly reheated to reflux under reduced pressure (10–15 mm.) for three to four hours to remove the last traces of hydrogen chloride and thus complete the reaction. The reaction mixture was next fractionally distilled under reduced pressure, whereby 307 grams (87.5% of the theoretical yield) of product was obtained. The water-white liquid product ($n_D^{20}$ 1.5752) boiled at 214–216° C. at 3.0 mm. pressure. The quantitative analysis of the product gave 44.72% carbon, 3.03% hydrogen, 9.05% phosphorus, and 29.04% chlorine.

*Example 2.—Bis(4-chlorophenyl) chloromethanephosphonate*

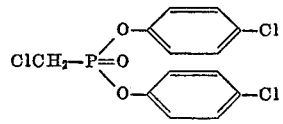

Para-chlorophenol (257.2 grams) was reacted with chloromethanephosphonyl dichloride (167.5 grams) in the same manner as described in Example 1. The liquid product obtained ($n_D^{20}$ 1.5741) boiled at 214–216° C. at 2.5 mm. Quantitative analysis of the product gave 44.10% carbon, 3.00% hydrogen, 8.71% phosphorus.

*Example 3.—Bis-(2,4-dichlorophenyl) chloromethanephosphonate*

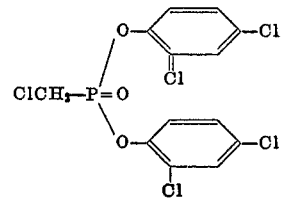

2,4-dichlorophenol (32.6 grams) was reacted with chloromethanephosphonyl dichloride (16.75 grams) in the same manner as described in Example 1. The liquid product obtained ($n_D^{20}$ 1.5898) boiled at 244–245° C. at 3.8 mm. A quantitative analysis of the product indicated 37.06% carbon, 2.07% hydrogen, 7.50% phosphorus.

*Example 4.—Bis-(2-bromophenyl) chloromethanephosphonate*

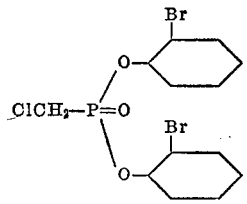

Ortho-bromophenol (346 grams) was reacted with chloromethanephosphonyl dichloride (167.5 grams) in the same manner as described in Example 1. The product obtained boiled at 222–224° at 2.0 mm.

*Example 5.—Diphenyl chloromethanephosphonate*

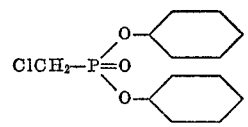

Phenol (188.2 grams) was reacted with chloromethanephosphonyl dichloride (167.5 grams) in the same manner as described in Example 1. The product boiled at 148–9° at 1.7 mm.

*Example 6.—Bis-(3,4-dimethylphenyl) chloromethanephosphonate*

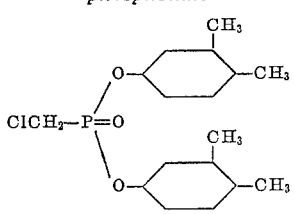

A mixture of 3,4-dimethylphenol (244.3 g.) was reacted with chloromethanephosphonyl dichloride (167.5 g.) in the manner described in Example 1. The product boiled at 162–164° C. at 2.6 mm.

*Example 7.—Bis-(4-tert-butylphenyl) chloromethanephosphonate*

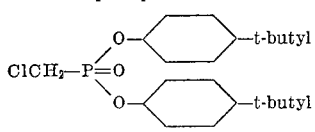

A mixture of p-tert-butylphenol (30 g.) was reacted with chloromethanephosphonyl dichloride (16.75 g.) in the manner described in Example 1. The product boiled at 171–2° C. at 2.7 mm.

*Example 8.—Bis-(octylphenyl) chloromethanephosphonate*

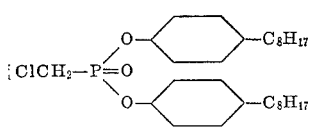

A mixture of 1,1,3,3-tetramethylbutylphenol (412.6 g.) was reacted with chloromethanephosphonyl dichloride (167.5 g.) in the manner described in Example 1. The product was an extremely viscous oil which was not distilled.

We claim:

1. New compounds of the symmetrical formula:

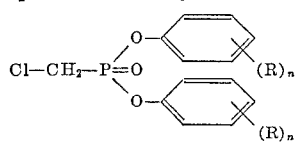

wherein R is selected from a single member of the group consisting of alkyl, containing 1 to 8 carbon atoms, chlorine, bromine and $n$ is 1 to 2.

2. New compounds according to claim 1 where R is alkyl, containing 1 to 8 carbon atoms.

3. New compounds according to claim 1 where R is chlorine.

4. The new compound bis-(2-chlorophenyl) chloromethanephosphonate having the formula:

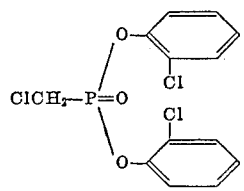

5. The new compound bis-(4-chlorophenyl) chloromethanephosphonate having the formula:

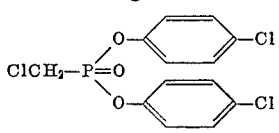

6. The new compound bis-(2,4-dichlorophenyl) chloromethanephosphonate having the formula:

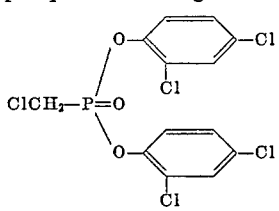

7. The new compound bis-(2-bromophenyl) chloromethanephosphonate having the formula:

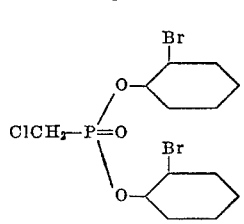

References Cited in the file of this patent

UNITED STATES PATENTS 2,682,522    Coover et al. _____ June 29, 1954

OTHER REFERENCES

Kabachnik et al.: Chem. Abst., vol. 42, page 4132 (1948).

Chem. Abst., vol. 45, pages 6570, 10191, 8444 (1952).